(12) United States Patent
Siegler et al.

(10) Patent No.: US 10,103,574 B2
(45) Date of Patent: Oct. 16, 2018

(54) CONTROLLED CONCURRENT UTILIZATION OF MULTIPLE POWER SUPPLIES

(71) Applicant: Microsoft Corporation, Redmond, WA (US)

(72) Inventors: John J. Siegler, Carnation, WA (US); Brian A. Janous, Olympia, WA (US); Sean M. James, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 933 days.

(21) Appl. No.: 14/311,277

(22) Filed: Jun. 21, 2014

(65) Prior Publication Data

US 2015/0372538 A1 Dec. 24, 2015

(51) Int. Cl.
*H02J 9/06* (2006.01)
*G06F 1/26* (2006.01)

(52) U.S. Cl.
CPC ............... *H02J 9/062* (2013.01); *G06F 1/26* (2013.01); *G06F 1/263* (2013.01); *Y10T 307/344* (2015.04)

(58) Field of Classification Search
CPC .................................. G06F 1/263; G06F 1/26
See application file for complete search history.

(56) References Cited

U.S. PATENT DOCUMENTS

| | | | |
|---|---|---|---|
| 3,638,040 A | 1/1972 | Mahmoud | |
| 7,269,751 B2 * | 9/2007 | Janakiraman | G06F 1/263 713/323 |
| 7,462,955 B2 | 12/2008 | Mcnamara et al. | |
| 7,557,464 B2 * | 7/2009 | Wang | H02M 1/10 307/65 |
| 7,800,248 B2 | 9/2010 | Kraemer et al. | |
| 8,624,433 B2 | 1/2014 | Whitted et al. | |
| 8,670,872 B2 | 3/2014 | Rasmussen et al. | |
| 8,736,107 B1 * | 5/2014 | Frink | H02J 9/06 307/100 |
| 9,377,832 B1 * | 6/2016 | Heydari Monfared | H05K 7/1457 |
| 2005/0146223 A1 * | 7/2005 | Kanouda | G06F 1/30 307/66 |
| 2005/0200205 A1 | 9/2005 | Winn et al. | |
| 2008/0258556 A1 | 10/2008 | Ewing et al. | |

(Continued)

OTHER PUBLICATIONS

"Second Written Opinion Issued in PCT Application No. PCT/US2015/036632", dated Apr. 29, 2016, 10 Pages.

(Continued)

*Primary Examiner* — Thienvu Tran
*Assistant Examiner* — Pinping Sun
(74) *Attorney, Agent, or Firm* — Davin Chin; Chin IP, PLLC

(57) ABSTRACT

Technology for concurrently powering equipment from multiple power sources, and the control thereof is disclosed. One example implementation of the technology includes a first power supply that powers equipment from a first power source and a second power supply that also powers the equipment from a second power source while the equipment is being powered by the first power supply. A target direct current (DC) output voltage of at least one of the power supplies is changed, thereby changing a ratio of the power being drawn from the first power supply to the power being drawn from the second power supply.

20 Claims, 7 Drawing Sheets

(56) References Cited

U.S. PATENT DOCUMENTS

| 2010/0042860 A1* | 2/2010 | Kwon | G06F 1/3203 |
| | | | 713/340 |
| 2010/0141039 A1* | 6/2010 | Belady | G06F 1/30 |
| | | | 307/68 |
| 2010/0207454 A1* | 8/2010 | Jagota | H02J 1/10 |
| | | | 307/80 |
| 2011/0006600 A1* | 1/2011 | Fontana | H02J 1/10 |
| | | | 307/25 |
| 2011/0025129 A1* | 2/2011 | Humphrey | G06F 1/263 |
| | | | 307/64 |
| 2011/0283119 A1* | 11/2011 | Szu | G06F 1/26 |
| | | | 713/300 |
| 2011/0304211 A1* | 12/2011 | Peterson | G06F 1/263 |
| | | | 307/48 |

OTHER PUBLICATIONS

"International Search Report and Written Opinion Issued in PCT Application No. PCT/US2015/036632", dated Sep. 17, 2015, 14 Pages.

Tu, et al., "Dynamic Provisioning in Next-Generation Data Centers with On-site Power Production", In Proceedings of 4th International Conference on Future Energy Systems, May 21, 2013, 12 pages.

"International Preliminary Report on Patentability Issued in PCT Application No. PCT/US2015/036632", dated Aug. 11, 2016, pp. 11.

"Office Action Issued in European Patent Application No. 15739057.6", dated Mar. 26, 2018, 10 Pages.

* cited by examiner

CONTROLLED CONCURRENT UTILIZATION OF MULTIPLE POWER SUPPLIES

BACKGROUND

The recent rise of online services has led a significant increase in the development, expansion, and improvement of data centers and similar technologies. Such data centers may be used, for example, to provide cloud computing services, facilitate popular social media services, or to provide infrastructure for e-commerce and other web sites.

A typical modern data center may include thousands, tens of thousands, hundreds of thousands, or more servers or other computing devices. A data center may also include supporting equipment such as switches, routers, input/output equipment, temperature management equipment, and/or the like. A data center also typically includes equipment for powering the computing devices and the supporting equipment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technology for concurrently powering equipment from multiple power sources, and the control thereof is disclosed. One example implementation of the technology includes a first power supply that powers equipment from a first power source and a second power supply that also powers the equipment from a second power source while the equipment is being powered by the first power supply. A target direct current (DC) output voltage of at least one of the power supplies is changed thereby changing a ratio of the power being drawn from the first power supply to the power being drawn from the second power supply.

As one non-limiting example, the disclosed technology may be employed to facilitate granular control over the ratio of power being drawn from the first power source to the power being drawn from the second power source. In addition, this granular control may also enable the ratio to be changed dynamically, e.g., in response to changing costs associated with the first and/or second power sources, availability of power from the first and/or second power sources, and/or other suitable factors. Also, the disclosed technology may also provide redundancy against power source and/or power supply failure. For example, if the first power source or first power supply fails or become degraded, the ratio may automatically change such that the second power supply and second power source automatically "step in" for the first power supply or first power source.

Other aspects of and applications for the disclosed technology will be appreciated upon reading and understanding the attached FIGUREs and description.

BRIEF DESCRIPTION OF THE DRAWINGS

Non-limiting and non-exhaustive embodiments of the present invention are described with reference to the following drawings. In the drawings, like reference numerals may refer to like parts throughout the various FIGUREs unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

Figure 1:
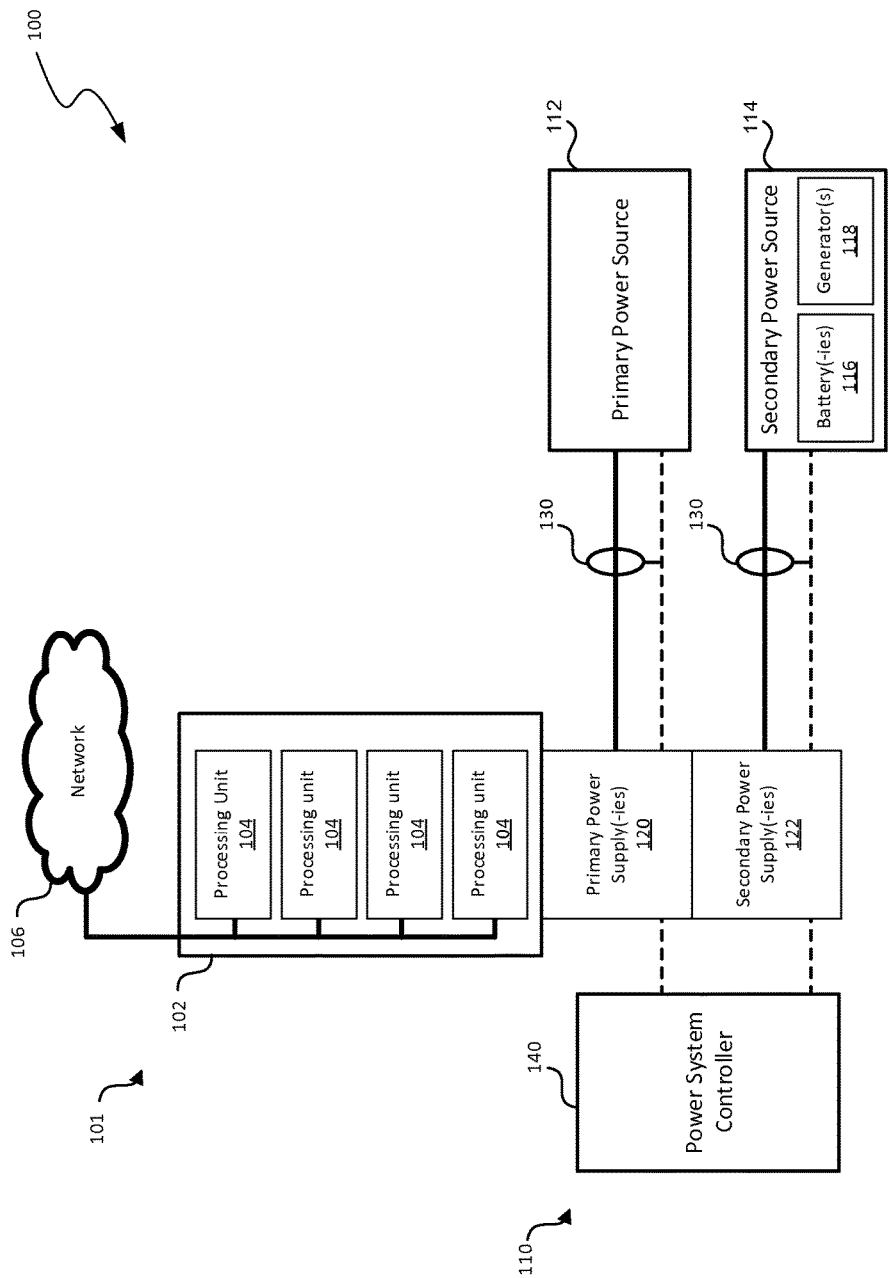
FIG. 1 is a block diagram illustrating an example of an environment having a power system in accordance with the disclosed technology.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. As used herein, the terms "component" and "system" are intended to encompass hardware, software, or various combinations of hardware and software. Thus, for example, a system or component may be a process, a process executing on a computing device, the computing device, or a portion thereof.

Technology for concurrently powering equipment from multiple power sources, and the control thereof is disclosed. One example implementation of the technology includes a first power supply that powers equipment from a first power source and a second power supply that also powers the equipment from a second power source while the equipment is being powered by the first power supply. A target direct current (DC) output voltage of at least one of the power supplies is changed, thereby changing a ratio of the power being drawn from the first power supply to the power being drawn from the second power supply.

As one non-limiting example, the disclosed technology may be employed to facilitate granular control over the ratio of power being drawn from the first power source to the power being drawn from the second power source. In addition, this granular control may also enable the ratio to be changed dynamically, e.g., in response to changing costs associated with the first and/or second power sources, availability of power from the first and/or second power sources, and/or other suitable factors. Also, the disclosed technology may be employed to provide automatic fallback protection and/or redundancy so that power may be provided from another power source or power supply in response to a failure and/or other inability of a power source or power supply to provide sufficient power. For example, if the first power source or first power supply fails or become degraded, the ratio may automatically change such that the second power supply and second power source automatically "step in" for the first power supply or first power source.

In addition, aspects of the disclosed technology may also address various non-idealities of typical power management technology. For example, data centers typically employ some form of a secondary power source (e.g., generators and/or batteries) to enable operation of processing units when power is unavailable from a primary power source (e.g., from an external power grid). However, many typical power systems employ transfer switches (e.g., "break before make" switches) that may cause disruptions in power flow. Other backup power systems may employ power synchronization equipment to synchronize the phase of alternating current (AC) power from generators to the phase of power from the primary power source. However, such power synchronization equipment is typically expensive, and it may be difficult to maintain synchronization over extended periods.

By employing various aspects of the disclosed technology, equipment may be powered from multiple power sources at the same time, and portions of the electrical load may be "steered" amongst the power sources. The disclosed technology may also be employed to facilitate greater participation in "demand response" and/or "load response" programs in which consumption of power from a primary power source (e.g., a power utility) is reduced while the utility is expecting and/or experiencing high demand. In addition, the disclosed technology may also be employed to provide automatic fallback protection and/or redundancy so that power may be provided from another power source or power supply in response to a failure and/or other inability of a power source or power supply to provide sufficient power.

FIG. 1 is a block diagram illustrating an example of environment 100 having a power system in accordance with the disclosed technology. As shown in FIG. 1, environment 100 includes computing system 101 and power system 110. Even though certain components of environment 100 are shown in FIG. 1, in other embodiments, other environments may include other suitable components in similar or different arrangements, examples of which is described below with reference to FIGS. 4 and 5. In addition, computing system 101 and/or power system 110 may be installed at a data center or other facility.

As shown in FIG. 1, computing system 101 includes multiple processing units 104 organized in fixture 102 and coupled to network 106. Fixture 102 may have any suitable shape and size, and may house processing units 104 in any suitable arrangement. Though only one fixture is shown in FIG. 1, in other examples, a computing system may include two, three, four, or any other suitable number of fixtures and/or other types of housings.

Processing units 104 may be server computing devices and may operate as web servers, application servers, database servers, and/or the like. In other examples, processing units 104 may include routers, switches, analog/digital input/output modules, modems, and/or other suitable components. Other examples of processing units include client computing devices, mobile computing devices, logic processors, network interface cards, and data storage devices. However, processing units 104 may include virtually any electronic apparatus adapted to perform logic comparisons, arithmetic calculations, electronic communications, electronic input/output, and/or other functions. Although FIG. 1 shows four processing units in fixture 102, one, two, three, five, or any other suitable number of processing units may be in a fixture.

Network 106 may enable communications over a wired medium (e.g., twisted pair wire, coaxial cable, untwisted pair wire, or optical fiber), a wireless medium (e.g., microwave spectrum, radio frequency spectrum, or infrared spectrum), or a combination of wired and wireless media. Network 106 may operate according to Ethernet, token ring, asynchronous transfer mode, cellular, WI-FI, Bluetooth, Infrared Data Association (IrDA), near field communication (NFC), ultra-wide band, and/or other suitable protocols. In further examples, network 106 may also include routers, switches, modems, and/or other suitable computing/communications components in any suitable arrangements.

As illustrated in FIG. 1, power system 110 includes primary power source 112, secondary power source 114, one or more primary power supplies 120, one or more secondary power supplies 122, power monitor 130, and power system controller 140.

Primary power source 112 (e.g., an external power grid) may provide power to processing units 104 via one or more primary power supplies 120. Although not illustrated in FIG. 1, primary power source 112 may include a power conversion unit (e.g., a transformer), a power conditioning unit (e.g., a rectifier, a filter, etc.), a power switching unit (e.g., an automatic transfer switch), a power protection unit (e.g., a surge protection circuit or a circuit breaker), and/or other suitable components.

Power system 110 also includes secondary power source 114 which may power processing units 104 via one or more secondary power supplies 122. As illustrated, secondary power source 114 includes one or more batteries 116 and one or more generators 118. However, secondary power source 114 may also include any of a variety of power sources, e.g., fuel cells, solar cells, wind power systems, geothermal power systems, and/or the like. In one example, secondary power source 114 primarily services a data center or other facility at which computing system 101 is located. However, in other examples, secondary power source 114 may service any number of facilities. For example, secondary power source 114 may be a secondary and/or backup power grid. Similar to primary power source 112, secondary power source 114 may include a power conversion unit (e.g., a transformer), a power conditioning unit (e.g., a rectifier, a filter, etc.), a power switching unit (e.g., an automatic transfer switch), a power protection unit (e.g., a surge protection circuit or a circuit breaker), and/or other suitable components.

One or more primary power supplies 120 are adapted to receive power from primary power source 112 (illustrated by the solid line connecting primary power source 112 and one or more primary power supplies 120) and to provide DC power for powering computing system 101. One or more primary power supplies 120 may include AC to DC power supplies (e.g., rectifiers), DC to DC power supplies, and/or the like.

Likewise, one or more secondary power supplies 122 are adapted to receive power from secondary power source 114 (illustrated by the solid line connecting secondary power source 114 and one or more secondary power supplies 122) and to provide DC power for powering computing system 101. As with primary power supply 120, secondary power supplies 122 may include AC to DC power supplies (e.g., rectifiers), DC to DC power supplies, and/or the like.

Power monitor 130 may be adapted to monitor the power provided by the primary power source 112 and/or the secondary power source 114 and provide information relating to such power to the power system controller 140. For example, power monitor 130 may monitor and report the instantaneous power drawn from primary power source 112 and/or from secondary power source 114. However, this is merely one example of a suitable power monitor. In other implementations, power monitor 130 may alternately or additionally monitor instantaneous, time-averaged, or other power at any point in power system 110 (e.g., within primary power source 112, secondary power source 114, one or more primary power supplies 120, and/or within one or more secondary power supplies 122). Likewise, power system controller 140 may employ a power monitor within one or more primary power supplies 120 and/or one or more secondary power supplies 122 to obtain information regarding power drawn from primary power source 112 and/or secondary power source 114. For example, such information might be obtained over a power management bus (PMBus) or other suitable interface. Power monitor 130 may include a Watt meter, a voltage meter, a current meter, and/or the like.

Power system controller 140 is adapted to control the concurrent powering of equipment, such as processing units 104, from multiple power sources. More specifically, power system controller 140 may be adapted to control target DC output voltages of the one or more primary power supplies 120 and/or one or more secondary power supplies 122. By adjusting the target DC output voltages, power system controller 140 may cause a change in a ratio of the power being drawn from one or more primary power supplies 120 to the power being drawn from one or more secondary power supplies 122. In turn, this may cause a change in the ratio of the power being drawn from primary power source 112 to the power being drawn from secondary power source 114.

Power system controller 140 may also control power system 110 and the operation thereof using information from power monitor 130. For example, power system controller 140 may control the powering of computing system 101 in a manner that limits the amount of power drawn from primary power source 112, or that controls the ratio of power drawn from primary power source 112 to the power drawn from secondary power source 114. This control may include open loop control, or closed loop control (e.g., employing feedback from power monitor 130).

Further, power system controller 140 may control power system 110 based on additional information. For example, this additional information may include cost of power from primary power source 112 and/or from secondary power source 114, availability of power from primary power source 112 and/or from secondary power source 114. The control may also be based on quantities of power being drawn from primary power source 112 and/or from secondary power source 114, either by a particular computing system or by multiple computing systems. As one specific example, power system controller 140 may control the ratio of instantaneous power being drawn from primary power source 112 to instantaneous power being drawn from secondary power source 114 based substantially on an overall amount of instantaneous power being drawn by a facility in which computing system 101 is located. However, power system controller 140 may control instantaneous, time-averaged, or other power in any suitable manner.

The operations of power system controller 140 may be manually controlled or may be automated. For example, a data center or energy management operator may instruct power system controller 140 to draw a lower percentage of power from primary power source 112 and a greater percentage of power from secondary power source 114 in response to telephone call from a power utility requesting a reduction in power draw from primary power source 112. Similarly, the operator may instruct power system controller 140 to cause more power to be sourced from primary power source 112 and less power from to secondary power source 114 at a later time.

Power system controller 140 may also include capabilities for automated control. For example, power system controller 140 may include an input interface that receives messages from primary power source 112 regarding power cost and availability and make automated decisions to optimize the cost of powering computing system 101, otherwise automate participation in "demand response" and/or "load response" programs, or to prevent a brownout or blackout.

Power system controller 140 may be implemented on a standalone computing device or on one of processing units 104. In further examples, power system controller 140 could also be a component of primary power source 112, secondary power source 114, or a chassis or rack controller (not shown).

Figure 2:
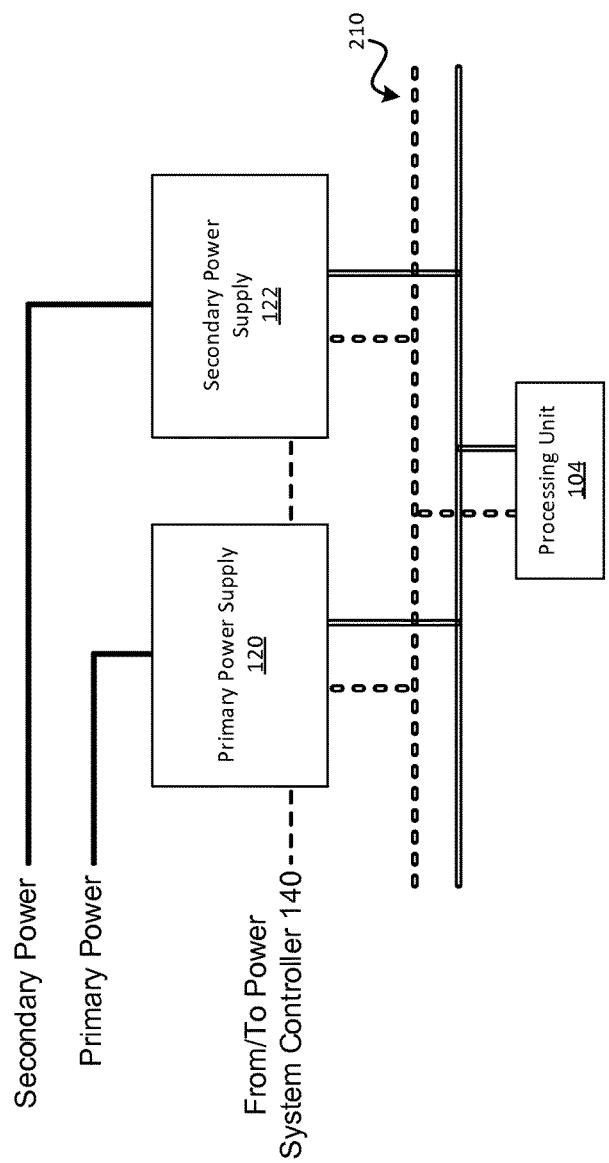
FIG. 2 is an example schematic diagram illustrating certain components of FIG. 1 in accordance with the disclosed technology.

FIG. 2 is an example schematic diagram illustrating certain components of FIG. 1 in accordance with the disclosed technology. FIG. 2 illustrates an example in which there is one primary power supply 120, one secondary power supply 122, and one processing unit 104. In this example, primary power supply 120 and secondary power supply 122 concurrently provide power to DC power bus 210 and processing unit 104 draws power from DC power bus 210.

In this example, primary power supply 120 and secondary power supply 122 each provide DC power to DC power bus 210 based on individual target output voltages. Also, the target output voltages of the two power supplies may be different. However, these target output voltages may be selected to maintain DC power bus 210 within a voltage range that is based on an input specification for processing unit 104. An example of a range is 11.9 Volts to 12.5 Volts, with a nominal value of 12.3 Volts.

The target output voltages of both primary power supply 120 and secondary power supply 122 may be controlled by power system controller 140. Alternately, one of the power supplies may have a fixed output voltage. For example, a fixed output voltage for one of the power supplies may be employed to reduce system cost but may result in greater deviation of DC bus voltage from the nominal value.

Regardless, power system controller 140 may adjust the target output voltage(s) of primary power supply 120 and/or primary power supply 120 using any suitable interface and/or protocol. For example, power system controller 140 may be interfaced to primary power supply 120 and/or secondary power supply 122 via an Ethernet interface, a RS-232 interface, an inter-integrated circuit (I2C) interface, a General Purpose Interface Bus (GPIB) interface, and/or the like. Likewise, instructions may be sent to primary power supply 120 and/or the secondary power supply 122 using the PMBus protocol, the System Management Bus (SMBus) protocol, and/or any other suitable protocol.

In operation, the relative values of the target output voltages of primary power supply 120 and secondary power supply 122 are associated with the extents to which the individual power supplies provide power to DC power bus 210 and thus to processing unit 104. For example, if the target output voltage of primary power supply 120 is higher than the target output voltage of secondary power supply 122, primary power supply 120 will generally power DC power bus 210 to a greater extent than secondary power supply 122. Accordingly, adjusting the target output voltage of one or both of the power supplies may cause a change in the ratios of the power being drawn from each of the power supplies and power sources.

Figure 3:
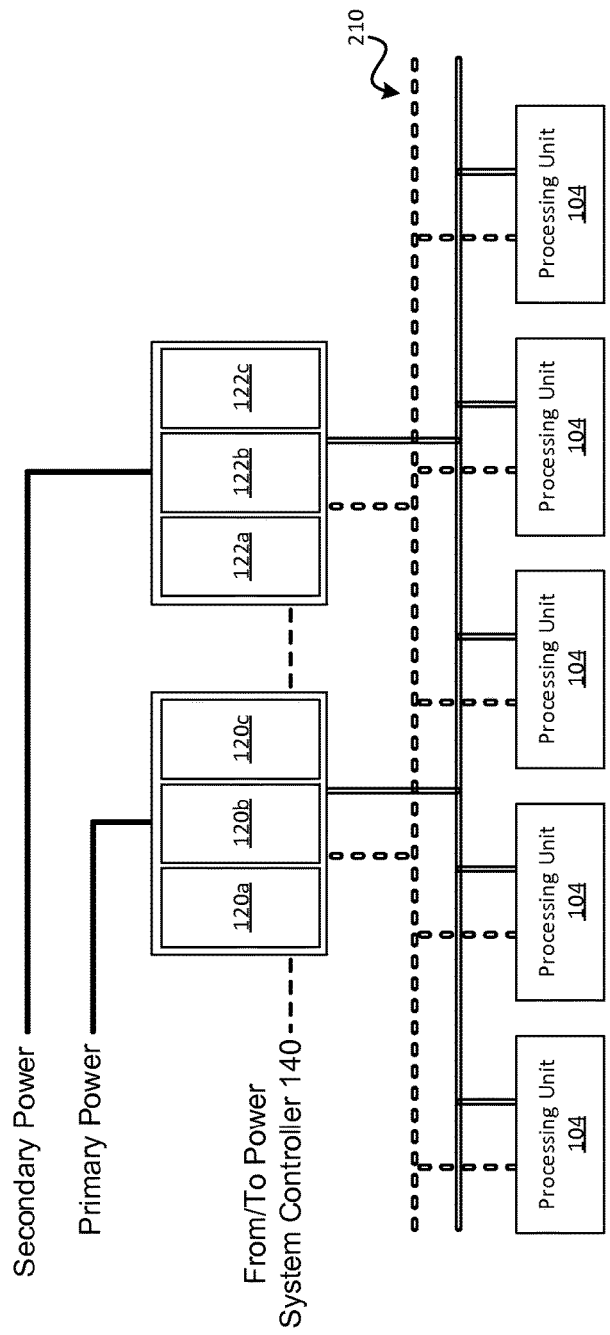
FIG. 3 is another example schematic diagram illustrating certain components of FIG. 1 in accordance with the disclosed technology.

FIG. 3 illustrates an example in which there are three primary power supplies 120a-120c, three secondary power supplies 122a-122c, and five processing units 104. In this example, primary power supplies 120a-120c are organized in a parallel arrangement with respect to each other (e.g., all drawing power from primary power source 112 and having the same target output voltage). Likewise, secondary power supplies 122a-122c are also organized in a parallel arrangement with respect to each other. In contrast to the example of FIG. 2, the use of multiple power supplies for each power source provides redundancy against power supply failure and may facilitate a more cost effective ratio of power supplies to processing units.

Although five processing units, two power sources, and three power supplies per power source are illustrated in FIG. 3, any suitable quantity of power sources, power supplies, and processing units may be employed. Also, equipment other than processing units may also be suitably powered with the disclosed technology. For example, the disclosed technology may be employed to power equipment such as communications equipment, industrial/manufacturing equipment, consumer equipment, and/or the like. In addition, AC equipment may also be powered using the disclosed technology, e.g., an inverter may be employed to convert power from DC power bus 210 to AC power.

Figure 4:
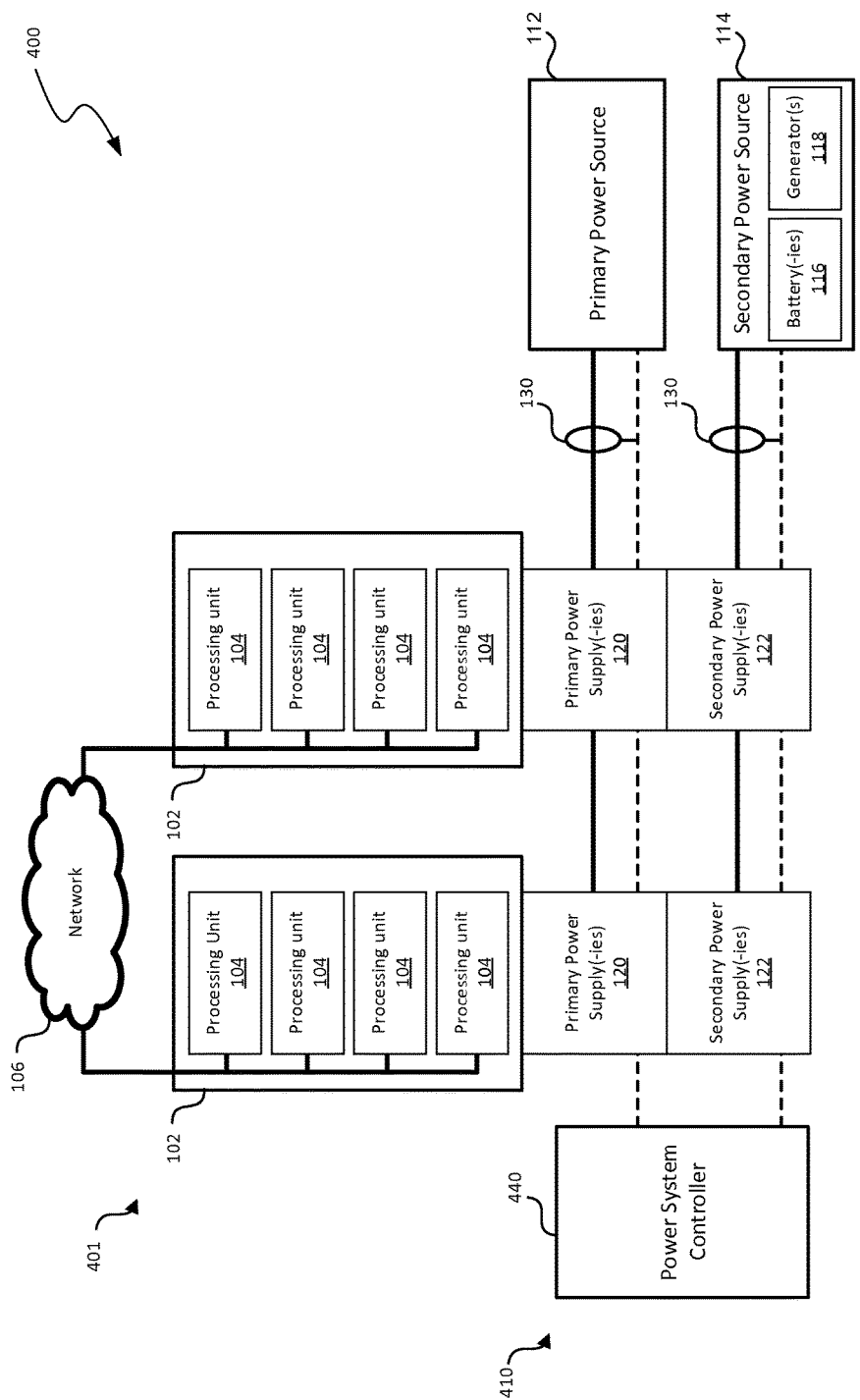
FIG. 4 is a block diagram illustrating an example of another environment having another power system in accordance with the disclosed technology.

FIG. 4 is a block diagram illustrating environment 400 having power system 410 in accordance with the disclosed technology. Environment 400 may be generally similar in structure and function to environment 100 of FIG. 1 except that computing system 401 includes two fixtures 102, and power system 410 includes two sets of primary power supply(-ies) 120 and two sets of second secondary power supply(-ies) 122. In this example, power system controller 440 may control power supplies 120 and 122 based on the total power drawn from primary power source 112 and/or the total power drawn from secondary power source 114. In other words, power system controller 440 may be adapted to manage the overall power draw of a facility.

Figure 5:
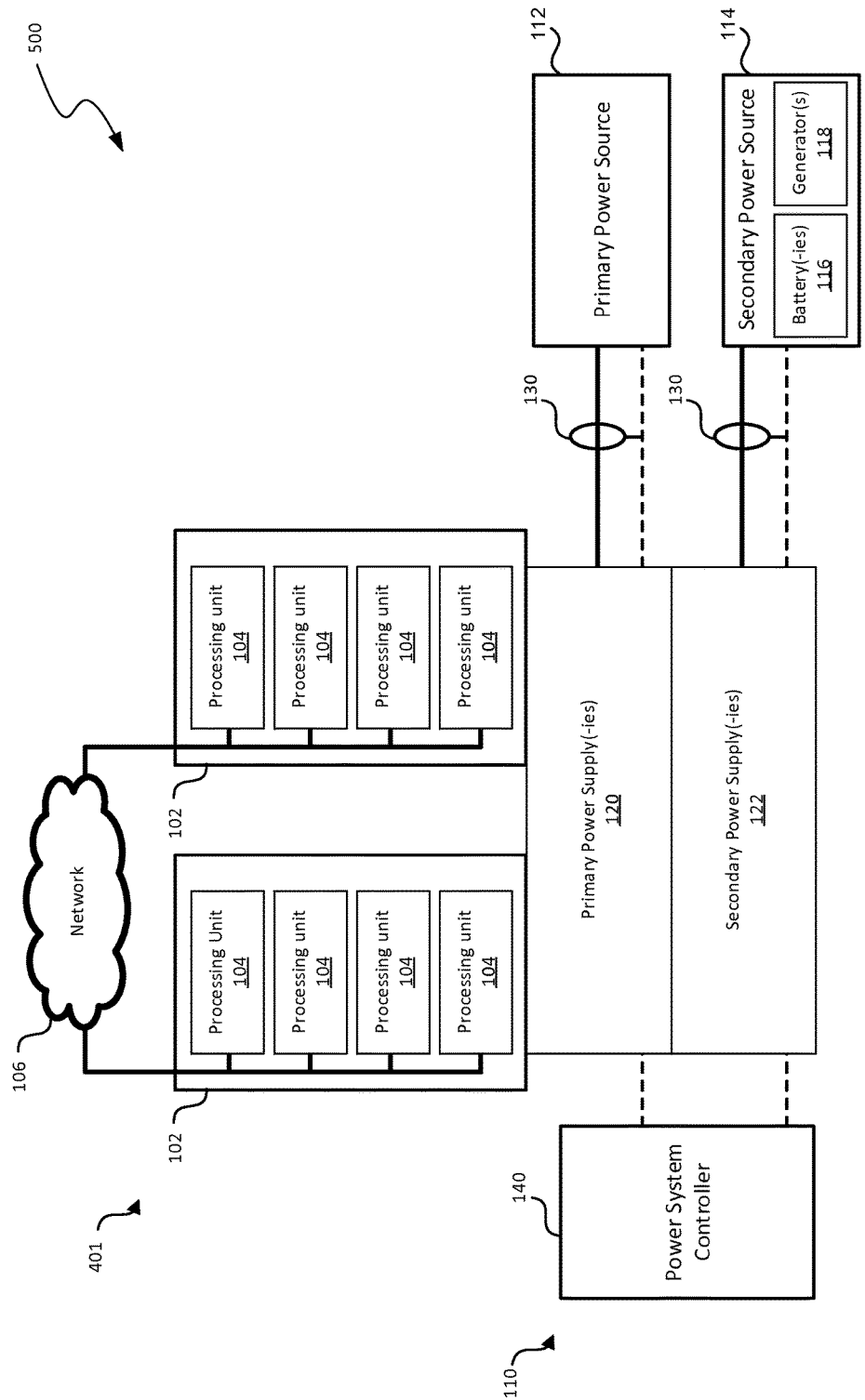
FIG. 5 is a block diagram illustrating an example of yet another environment having yet another power system in accordance with the disclosed technology.

FIG. 5 is a block diagram illustrating environment 500 having power system 110 in accordance with the disclosed technology. Environment 500 may be generally similar in structure and function to environment 400 of FIG. 4 except that power system 110 is employed to power computing system 401.

Figure 6:
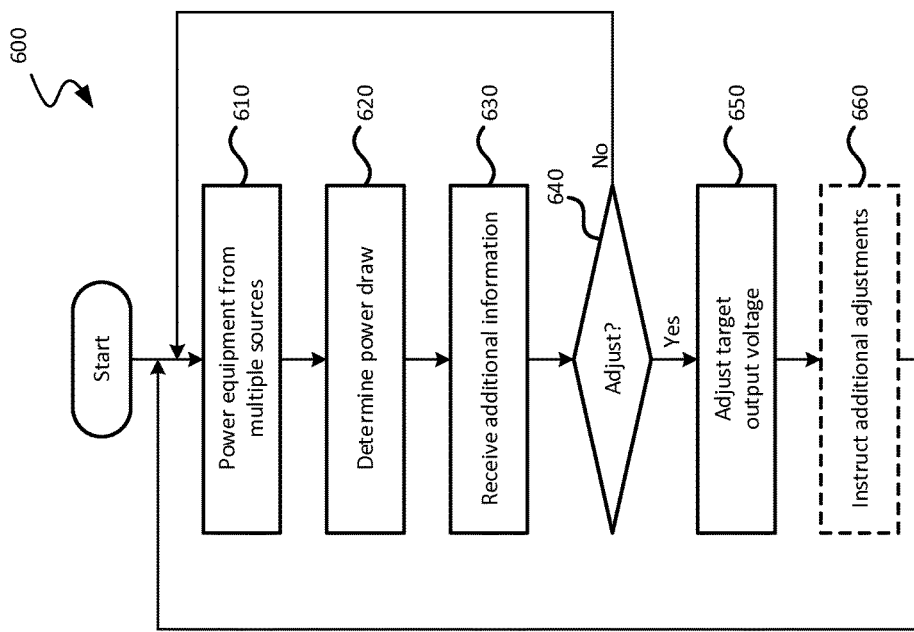
FIG. 6 is a logical flow diagram illustrating a process for powering equipment in accordance with the disclosed technology.

FIG. 6 is a logical flow diagram illustrating process 600 for powering equipment. For clarity, the processes described herein are described in terms of operations performed in particular sequences by particular devices or components of a system. However, other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein.

These processes may also be embodied in a variety of ways. For example, they may be embodied on an article of manufacture, e.g., as computer-readable instructions stored in a computer-readable storage medium or be performed as a computer-implemented process or computer-controlled process, e.g., by a controller circuit of power system controller 140. Such a control circuit may include a microprocessor and/or a microcontroller. As an alternate example, these processes may be encoded as computer-executable instructions and transmitted via a communications medium. As another alternative, these processes and/or other technology described herein may be implemented in hardware. For example, this technology may be implemented in whole or in part in an application specific integrated circuit (ASIC), a field programmable gate array (FPGA), a programmable logic device (PLD), and/or the like.

Process 600 begins at 610 where equipment, such as processing units 104 of FIG. 1, are powered from multiple power sources. As discussed above, the powering of this equipment may include concurrently powering the equipment from a first power source through a first DC power supply and from a second power source through a second DC power supply. From 610, processing flows to 620.

At 620, the power draw for the first and/or second power source is determined. As one example, the power draw is determined based on information from power monitor 130 of FIG. 1. The determination may be of an instantaneous power draw from the first and/or second power source. However, other examples may differ. From 620, processing flows to 630.

At 630, additional information is received, for example, by power system controller 140. Such information may include an instruction to change the ratio of the power drawn from the first power source to the power drawn from the second power source, a dynamic cost of power from the first power source and/or from the second power source, and/or a dynamic demand on the first power source and/or on the second power source. From 630, processing flows to 640.

At 640, it is determined whether an adjustment is to be made to the powering of the equipment. This determination may also include determining the particular adjustment(s) that are to be made, and the determination may be based on the determined power draw or on the received additional information. If, at 640, it is determined that no adjustment is to be made, processing flows to 610. Otherwise, processing flows to 650.

At 650, the target output voltage of one or more of the power supplies is adjusted. For example, this adjustment may be initiated or instructed by power system controller 140, then implemented by the individual power supply(-ies). In one example, the adjustment includes adjustment of the target output voltage for the power supply(-ies) drawing power from just one of the power sources. However, the adjustment could alternately include changing target output voltages for the power supplies drawing power from a first power source to a first value and changing target output voltages for the power supplies drawing power from a second power source to a second value. The adjustment at 650 may also include receiving and employing feedback to make further changes. For example, the power draw from the first and/or second power supply may be monitored following a first change, and additional changes could be made based on the monitored power draw. From 650, processing optionally flows to 660.

At 660, additional adjustments, e.g., to power supplies powering other equipment, may be instructed. As one example, such additional adjustments may be instructed by power system controller 140 to control the powering equipment throughout a data center or other facility. From 660, processing returns to 610.

Figure 7:
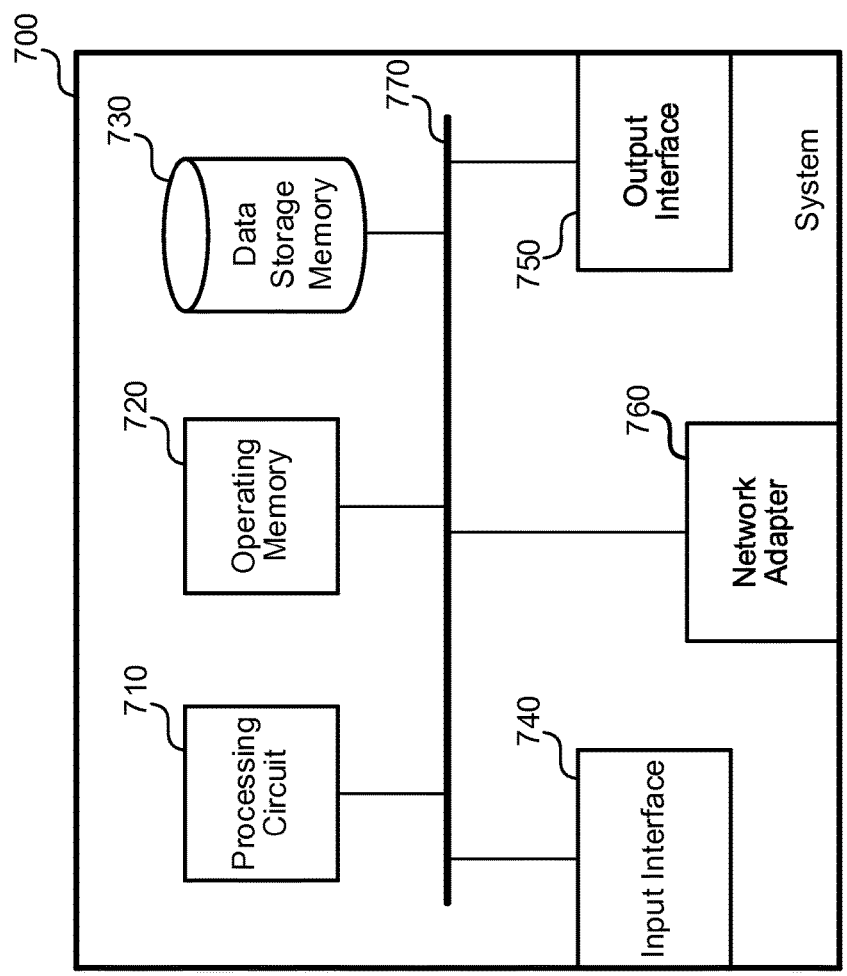
FIG. 7 is a block diagram illustrating example hardware components of a computing device in which aspects of the technology may be practiced.

FIG. 7 is a high-level illustration of example hardware components of computing device 700, which may be used to practice various aspects of the technology. For example, computing device 700 may be employed as power system controller 140 or processing unit 104 of FIG. 1, or as power system controller 440 of FIG. 4. In addition, computing device 700 may be employed to perform process 600 of FIG. 6. As shown, computing device 700 includes processing circuit 710, operating memory 720, data storage memory 730, input interface 740, output interface 750, and network adapter 760. These aforementioned components may be interconnected by bus 770.

Computing device 700 may be virtually any type of general- or specific-purpose computing device. For example, computing device 700 may be a user device such as a desktop computer, a laptop computer, a tablet computer, a display device, a camera, a printer, or a smartphone. Likewise, computing device 700 may also be server device such as an application server computer, a virtual computing host computer, or a file server computer.

Computing device 700 includes processing circuit 710 which may be adapted to execute instructions, such as instructions for implementing the above-described processes or other technology. Processing circuit 710 may include a microprocessor and/or a microcontroller and may serve as a control circuit. The aforementioned instructions, along with other data (e.g., datasets, metadata, operating system instructions, etc.), may be stored in operating memory 720 and/or data storage memory 730. In one example, operating memory 720 is employed for run-time data storage while data storage memory 730 is employed for long-term data storage. However, each of operating memory 720 and data storage memory 730 may be employed for either run-time or long-term data storage. Each of operating memory 720 and data storage memory 730 may also include any of a variety of data storage devices/components, such as volatile memories, semi-volatile memories, non-volatile memories, random access memories, static memories, disks, disk drives, caches, buffers, or any other media that can be used to store information. However, operating memory 720 and data storage memory 730 specifically do not include or encompass communications media, any communications medium, or any signals per se.

Also, computing device 700 may include or be coupled to any type of computer-readable media such as computer-readable storage media (e.g., operating memory 720 and data storage memory 730) and communication media (e.g., communication signals and radio waves). While the term computer-readable storage media includes operating memory 720 and data storage memory 730, this term specifically excludes and does not encompass communications media, any communications medium, or any signals per se.

Computing device 700 also includes input interface 740 and output interface 750. Input interface 740 may be adapted to enable computing device 700 to receive information from a power monitor, power supply, power source, and/or other information source. Such information may include an instantaneous power draw from a power source as well as any of the other information mentioned in this disclosure. Output interface 750 may be adapted to provide instructions to power supplies. For example, one such instruction is an instruction to a power supply to adjust a target DC output voltage. Output interface 750 may include a RS-232 interface, an I2C interface, a GPIB interface, and/or the like.

Computing device 700 also includes network adapter 760 which may be adapted to interface computing device 700 to a network such as network 106. Network adapter 760 may include a network interface card (NIC), a media access control (MAC) interface, a physical level interface (PHY), and/or the like. Network adapter 760 may also serve as an input and/or output interface for computing device 700.

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

We claim:

1. A system, the system comprising:
   a first set of power supplies powered from a first power source, wherein the first set of power supplies is adapted to provide direct current (DC) power, based on a first target DC output voltage, to a DC power bus, wherein the first target DC output voltage of the first set of power supplies is within a voltage range that is suitable for powering equipment via the DC power bus;
   a second set of power supplies powered from a second power source, wherein the second set of power supplies is adapted to provide DC power to the DC power bus, based on a second target DC output voltage, while the first set of power supplies is also providing power to the DC power bus, wherein the second target DC output voltage of the second set of power supplies is within the voltage range that is suitable for powering the equipment via the DC power bus;
   a plurality of processing units that are powered from the DC power bus; and
   a power system controller that is adapted to control instantaneous power draw from the first power source relative to instantaneous power draw from the second power source via adjustment of at least one of the first target DC output voltage or adjustment of the second target DC output voltage based on at least one of a cost of power from the first power source or a cost of power from the second power source, wherein the adjusted one of the at least one of the first target DC output voltage or the second target DC output voltage is within the voltage range that is suitable for powering the equipment.

2. The system of claim 1, wherein:
the adjustment of the at least one of the first target DC output voltage or the second target DC output voltage causes a change in a ratio of power supplied to the plurality of processing units from the first power source to power supplied to the plurality of processing units from the second power source.

3. The system of claim 1, wherein:
the adjustment of the at least one of the first target DC output voltage or the adjustment of the second target DC output voltage causes the first target DC output voltage to be higher than the second target DC output voltage; and
the adjustment of the at least one of the first target DC output voltage or the adjustment of the second target DC output voltage also causes the plurality of processing units to be powered by a greater extent from the first set of power supplies than from the second set of power supplies.

4. The system of claim 1, further comprising:
an inverter adapted to receive DC power from the DC power bus, convert the received DC power to alternating current (AC) power, and power at least one of the plurality of processing units with the converted AC power.

5. The system of claim 1, further comprising:
at least one power monitor adapted to monitor the instantaneous power draw from at least one of the first power source or the instantaneous power draw from the second power source and to provide information relating to the instantaneous power draw from at least one of the first power source or the instantaneous power draw from the second power source to the power system controller, wherein:
the power system controller is further adapted to control the instantaneous power draw from at least one of the first power source or the instantaneous power draw from the second power source based on the information from the power monitor.

6. The system of claim 5, wherein the power system controller is further adapted to control the instantaneous power draw from at least one of the first power source or the instantaneous power draw from the second power source based on additional information, including at least one of:
a cost of power from at least one of the first power source or from the second power source;
an availability of power from at least one of the first power source or from the second power source;
quantities of power being drawn from at least one of the first power source or from the second power source; or
an instruction to change a sourcing of power from at least one of the first power source or from the second power source.

7. The system of claim 5, wherein the information is based substantially on an overall amount of power being drawn, by a facility in which the plurality of processing units are located, from at least one of the first power source or from the second power source.

8. A method of powering equipment, the method comprising:
concurrently powering the equipment from a first power source through a first direct current (DC) power supply and from a second power source through a second DC power supply;
determining that a change is to be made to a ratio of instantaneous power being drawn from the first power source to instantaneous power being drawn from the second power source; and
adjusting a target output voltage of the first power supply relative to a target output voltage of the second power supply based on at least one of a cost of power from the first power source or a cost of power from the second power source, wherein the adjusted target output voltage of the first power supply and the target output voltage of the second power supply are both within a voltage range that is suitable for powering the equipment.

9. The method of claim 8, further comprising:
determining the instantaneous power being drawn from the first power source; and
determining the instantaneous power being drawn from the second power source, wherein determining that the change is to be made includes:
determining that the change is to be made based on at least one of the determined instantaneous power being drawn from the first power source or on the determined instantaneous power being drawn from the second power source.

10. The method of claim 8, wherein:
determining that the change is to be made includes:
determining that the change is to be made based on at least one of a received instruction to change the ratio, a dynamic cost of power from the first power source, a dynamic cost of power from the second power source, a dynamic demand on the first power source, or a dynamic demand on the second power source.

11. The method of claim 8, wherein:
determining that the change is to be made includes:
determining that the change is to be made based on the instantaneous power being drawn from at least one of the first power source or the instantaneous power being drawn from the second power source based on an input;
adjusting the target output voltage of the first power supply includes:
making a first change to the target output voltage of the first power supply;
monitoring a power draw from at least one of the first power source or from the second power source; and
making at least one additional change to the target output voltage of the first power supply based on the monitored power draw.

12. The method of claim 11, wherein monitoring the power draw includes:
monitoring a current draw from at least one of the first power source or from the second power source.

13. The method of claim 8, further comprising:
providing an instruction to adjust a target output voltage of a third DC power supply, wherein the third DC power supply and a fourth DC power supply concurrently power other equipment at a same facility as the equipment.

14. The method of claim 8, wherein an output of the first DC power supply, an output of the second DC power supply, and an input of the equipment are all coupled to a same power bus.

15. The method of claim 8, wherein:
the first DC power supply includes a plurality of alternating current (AC) to DC rectifiers having outputs coupled to a common DC bus;
the second DC power supply includes another plurality of AC to DC rectifiers having outputs coupled to the common DC bus;
the plurality of AC to DC rectifiers of the first DC power supply are adapted to provide power to the DC bus based on the target output voltage of the first power supply; and
the plurality of AC to DC rectifiers of the second DC power supply are adapted to provide power to the DC bus based on the target output voltage of the second power supply, wherein the target output voltage of the second power supply is different than the target output voltage of the first power supply.

16. An apparatus for controlling concurrent powering of equipment from multiple power sources, the apparatus comprising:
an input interface adapted to receive information from at least one power monitor regarding an instantaneous power draw from at least one of a first power source or an instantaneous power draw from a second power source;
a control circuit that is adapted to:
receive the information from the input interface;
determine, based on the received information and based on at least one of a cost of power from the first power source or a cost of power from the second power source, that a change is to be made to the instantaneous power draw from the first power source relative to the instantaneous power draw from the second power source; and
generate an instruction to adjust a target direct current (DC) voltage output value of a first power supply that is adapted to concurrently, with a second power supply, power the equipment, wherein the first power supply is also adapted to power the equipment from the first power source and the second power supply is adapted to power the equipment from the second power source; and
an output interface that is adapted to instruct the first power supply to adjust a target DC voltage of the first power supply, wherein the adjusted target output voltage of the first power supply and an output voltage of the second power supply are both within a voltage range that is suitable for powering the equipment.

17. The apparatus of claim 16, wherein the controller circuit includes at least one of a microprocessor or a microcontroller.

18. The apparatus of claim 16, wherein the first power supply outputs DC power at a power bus, the second DC power supply outputs DC power at the power bus, and the equipment draws input power from the power bus.

19. The apparatus of claim 16, wherein:
either the first power source or the second power source primarily services a facility at which the equipment is located; and
the other of the first power source or the second power source provides power to the facility via an external power grid.

20. The apparatus of claim 16, wherein the equipment includes a plurality of server computing devices, and wherein the equipment is installed at a datacenter facility.

* * * * *